United States Patent
Dulin

(10) Patent No.: US 7,168,450 B2
(45) Date of Patent: Jan. 30, 2007

(54) VALVE ADAPTER

(75) Inventor: Robert D. Dulin, Kingsbury, TX (US)

(73) Assignee: Research by Copperhead Hill, Inc., Kingsbury, TX (US)

( * ) Notice: Subject to any disclaimer, the term of this patent is extended or adjusted under 35 U.S.C. 154(b) by 427 days.

(21) Appl. No.: 10/797,498

(22) Filed: Mar. 10, 2004

(65) Prior Publication Data

US 2005/0199296 A1   Sep. 15, 2005

(51) Int. Cl.
*F16K 15/14* (2006.01)

(52) U.S. Cl. .................... 137/614.2; 137/360; 251/318
(58) Field of Classification Search ............ 137/614.2, 137/360, 272, 291, 60–62; 251/264, 318
See application file for complete search history.

(56) References Cited

U.S. PATENT DOCUMENTS 5,632,303 A * 5/1997 Almasy et al. ............. 137/360
6,880,573 B2 * 4/2005 Berkman et al. ........ 137/614.2

* cited by examiner

*Primary Examiner*—Kevin Lee
(74) *Attorney, Agent, or Firm*—David LeCroy

(57) ABSTRACT

An adaptive fitting for valves. The adaptive fitting has a fitting body having a first end and a second end. The fitting body defines an inner passageway extending from the first end of the fitting to the second end. The fitting is provided with a valve-engaging portion disposed on the first end of the fitting body. This valve-engaging portion has a threaded region for threadably engaging a threaded section of a valve. On the second end of the fitting body is disposed a sealing portion. The fitting is provided with one or more ports disposed about or near the first end of the fitting body for allowing flow there through.

11 Claims, 4 Drawing Sheets

VALVE ADAPTER

BACKGROUND OF THE INVENTION

1. Field of the Invention

The present invention relates to connectors or adapters for valves that allows or permits the valve to be joined to a flow line. More specifically, the present invention relates to a valve adapter that enables a valve found in a water hydrant to be replaced with a different valve.

2. Background Information

Damage often occurs to water pipes and faucets that are externally exposed to freezing conditions due to the expansion of water when it freezes. As a solution to this problem, hydrants or faucets have been designed that are mounted within the wall of a building, for example, such as is described in U.S. Pat. No. 4,022,243. This placement of the hydrant is typically warm enough to prevent freezing of the piping, although the faucet head that is exposed to the elements can still be subject to freezing. Water that may have collected in the hydrant piping in the wall can be kept above freezing simply from the heat of the building that it is placed in. Further, this piping is typically placed in the wall at a slight angle so that water is directed towards the faucet head. In doing so, water within the valve body of the hydrant is able to discharge from the body prior to a freezing situation.

Still, this design is not foolproof in preventing any water within the wall hydrant from freezing during acclimate conditions. For example, a hose may be connected to the faucet head. This hose can be in a position where it is at an elevation higher than the wall hydrant, such as mounted on a reel above the hydrant. Further, the hydrant may be installed improperly with the discharge end not lower than the supply end. Also, the building may settle so that the discharge end is not lower than the supply end.

FIG. 1 is an exploded view of a commercially available sill cock or wall hydrant with the hydrant generally designated as numeral 10. Referring to FIG. 1, it is seen that the hydrant includes a handle 14, a faucet head 13 and a valve body or housing 15. The valve housing 15 can be of any material suitable for use in wall hydrant applications, such as copper, stainless steel, polyvinyl chloride, etc. Typically, the housing 15 is copper tubing. The housing 15 can be of any length through the wall required to connect the externally mounted head 13 with an internal fluid supply line (not shown).

At the supply end 11 of the housing 15 is mounted a valve body connector 16 for connecting the wall hydrant 10 with the water supply. At least part of the adapter 16 is threaded for connecting with the internal supply line. Preferably, the connector 16 is both internally and externally threaded 20. The connector 16 can be threadedly connected to the housing 15, but is typically soldered to the housing 15 in order to secure the connection from any leaks. The connector 16 can also be integral with the housing 15. The connector 16 further includes a valve seat (not shown) concentric to a fluid channel through the hydrant 10. Centrally positioned within the valve seat is a valve port (not shown) through which flow through the hydrant 10 is controlled, as will be explained below.

Running internally through the housing 15 from the faucet head 13 to the adapter seat is a valve stem 21. Like the housing 15, this stem 17 can be of any material suitable for use in wall hydrant applications, and typically is copper. At the supply end 11 of the stem 17 is a valve nut or like element 18 for mating with the connector valve seat. The stem 17 is positioned substantially centrally within the housing 15, and has an external diameter that is smaller than the internal diameter of the housing 15. The stem 21, and therefore the element 22, is positioned within the housing 15 so that it covers the adapter valve port 17 when seated on the connector seat. In this manner, fluid flow through the hydrant 10 is prevented. The valve element 18 can include a valve gasket 19 for ensuring that the seal created by the element 18 seating on the seat is complete and that no flow is permitted there through. The valve stem element 18 is able to freely rotate around the valve stem 21. Such design enables the element 18 to be stationary upon the connector seat as the stem 17 is extended by the rotation of the handle 25 against the element 22. The element 18 is secured around the end of the stem 17 by a screw or valve stem element connector (not shown).

At the discharge end 12 of the hydrant 10, the stem 17 is connected to the handle 14 by a screw or stem handle connector 26. At least a portion of the stem handle 20 is threaded (not shown) for sealingly engaging with a handle-to-faucet connector 29. At least a portion of the connector 21 is externally threaded 22 for threadedly engaging with the faucet 13. The connector 21 further includes a nut portion 24 whereby one is able to screw the connector 21, and therefore the handle 14 and stem 21, into the faucet 13 and valve body 15. The connector 21 includes a gasket 23 for creating a seal when securely engaged with the faucet 13. In this manner, both the faucet 13 and the connector 21 remain stationary while the handle 14 and valve stem 17 are rotated.

Rotation of the handle 14 in one direction moves the stem 17 and its element 18 towards the connector seat until the element 18 sealingly engages with the seat over the port, thereby blocking flow through the valve 10. Rotation of the handle 14 in the other direction moves the stem 17 and its element 18 away from the connector seat, thereby permitting flow through the valve 10.

Many times a hose or other accessory may be attached to the end of the faucet 13. This accessory may already contain fluid in it that has frozen, causing the outlet of the faucet to be blocked. Water within the valve body 15 is trapped. In freezing conditions, that water can freeze, thereby increasing in volume within the faucet valve body 15. As that volume increases, the pressure within the valve 10 increases to a point that can be in excess of that which is needed to rupture the valve body 15. Should such a rupture occur, the subsequent leakage through the body 15 can be extremely damaging due to its camouflaged nature, as the leakage occurs within the confines of the wall space.

Valves designed to remedy problems such as that described above have only recently been described. These include, for example, the valve described in U.S. Pat. No. 6,530,391. Still, these valves are not readily adapted for replacing valves in wall-mounted faucets or stand-alone faucets. Accordingly, there is a need for an adapter that enables the simple and quick installment of a valve into a wall hydrant or stand-alone hydrant.

SUMMARY OF THE INVENTION

The present invention disclosed herein alleviates the drawbacks described above with respect to enabling a valve such as that described in the '391 patent to be installed in a water hydrant. The valve adapter of the present invention is easily installed in presently available wall-mounted and stand-alone hydrants. It allows replacement of the valve without breaking up the wall to gain access.

In one aspect the adapter includes a substantially hollow member having an outer surface, a posterior inner shaft having a posterior inner diameter and an anterior inner surface having an anterior inner diameter. The adapter can include an anterior inner threaded surface extending at least a portion of the anterior inner surface, as well as an anterior outer threaded surface extending about at least a portion of the anterior inner surface. The adapter can have a posterior sealing portion and additionally one or more ports positioned on the hollow member for allowing flow from the inner surface to the outer surface.

In another aspect the adapter also includes a backflow preventer for preventing flow from returning through the posterior-sealing portion. This backflow preventer can comprise a threaded portion for threadedly engaging with the anterior inner threaded surface.

In one aspect, the posterior sealing portion of the adapter includes a gasket. In another aspect, the posterior sealing portion includes a resilient elastomeric seal such as an o-ring. In one aspect, the anterior outer threaded surface includes an anterior gasket for sealingly engaging with a faucet head.

The adaptive fitting of the present invention can serve in connecting a valve to a water hydrant. The fitting includes a fitting body having a first end and a second end, wherein the fitting body defines an inner passageway extending from the first end to the second end. A valve-engaging portion disposed on the first end of the fitting body is provided. The valve-engaging portion has a threaded region for threadably engaging a threaded set of a valve. The fitting is provided with a sealing portion disposed on the second end of the fitting body, as well as one or more ports disposed about or near the first end of the fitting body for allowing flow there through.

In one aspect, the fitting also includes a backflow preventer for preventing flow from returning through the sealing portion. This backflow preventer can have a threaded portion for threadedly engaging with the valve-engaging portion.

In one aspect, the sealing portion of the fitting includes a gasket. In another aspect, the first end of the fitting has a hydrant-engaging portion for securing the fitting to a hydrant. In one aspect, this hydrant-engaging portion further includes a gasket for sealingly engaging with a faucet head.

As designed, the valve adapter of the present invention is easily and conveniently installed in a faucet. Its simple design allows it to be inexpensively manufactured. It may be manufactured in a wide range of sizes, based upon the size of the hydrant to be served.

The general beneficial effects described above apply generally to each of the exemplary descriptions and characterizations of the devices and mechanisms disclosed herein. The specific structures through which these benefits are delivered will be described in detail herein below.

DETAILED DESCRIPTION OF THE INVENTION

Figure 1:
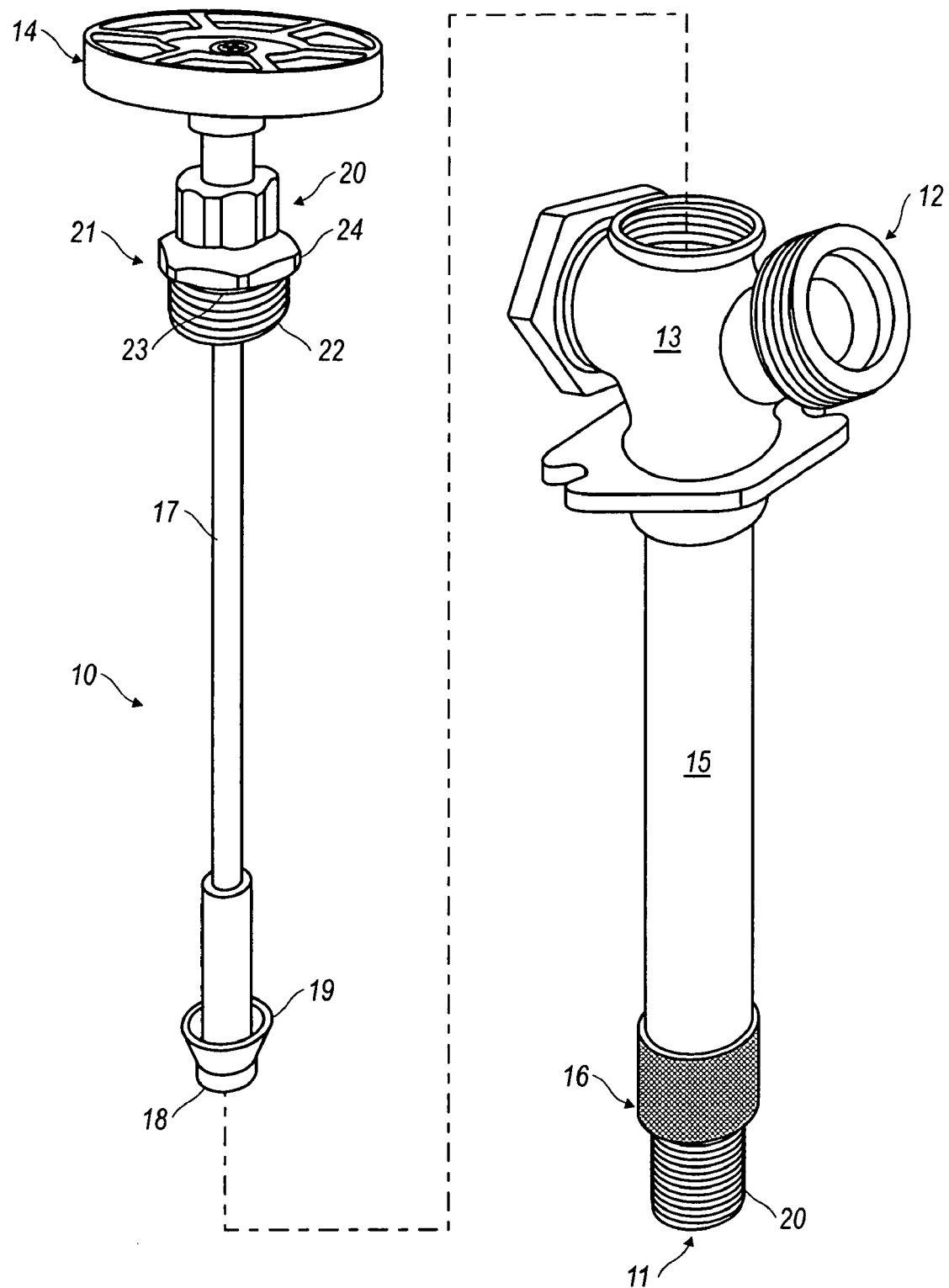
FIG. 1 is an exploded perspective view of a sill cock or wall hydrant found in the art illustrating the valve portion of hydrant.

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. For example, although described as for use in a water hydrant, it should be understood that the adapter could be used in other hardware as appropriate.

Referring to FIGS. 2–5, the valve adapter of the present invention is generally indicated at 25. The adapter or valve coupling or adaptive fitting 25 has a fitting body having a first or anterior end 28 and a second or posterior end 29, with the anterior end 28 adapted for engaging with a valve 41 of a faucet or hydrant 10. The adapter 25 includes a hollow member or cylindrical housing 27 having an internal passageway. The housing 27 is provided with external anterior stem threads 32 for communication or secured connection with the faucet head 13. The housing 27 can have one or more ports 38 positioned thereon. The ports 38 and their function will be described more fully hereinafter. The external diameter of the housing or fitting body 27 should be of such size that it is able to fit within the valve housing 15.

In one embodiment, the posterior or sealing end 29 of the coupling 25 is provided with a posterior gasket or resilient elastomeric seal 36 whereby a seal is effected between the coupling 25 and the internal diameter of the valve housing 15. Accordingly, the external diameter of the posterior gasket 36 should be equal to or slightly larger than the internal diameter of the valve housing 15. The flexible nature of the elastomeric seal 36 should allow it to be positioned within the valve housing 15. One skilled in the art will recognize that by varying the length of the coupling 25, the depth within the housing 15 at which the seal is effected can be varied. In one embodiment, the sealing end 29 is provided with a posterior gasket seat 37. In this manner, the posterior elastomeric seal 36 can be positioned within the valve housing 15.

Figure 2:
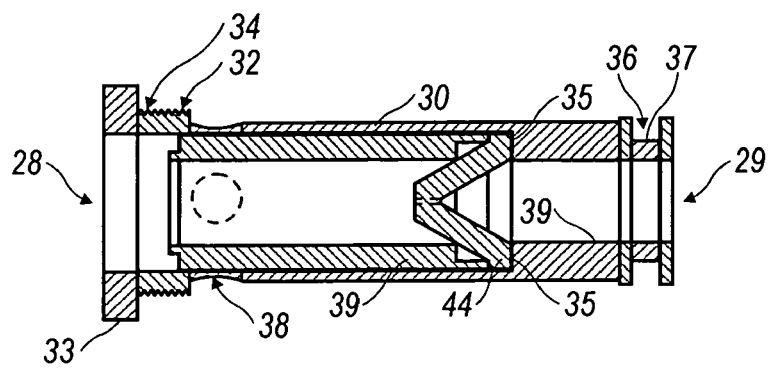
FIG. 2 is a cross sectional lengthwise view of one embodiment of a valve adapter according to the present invention suitable for use in the wall hydrant of FIG. 1.
Figure 3:
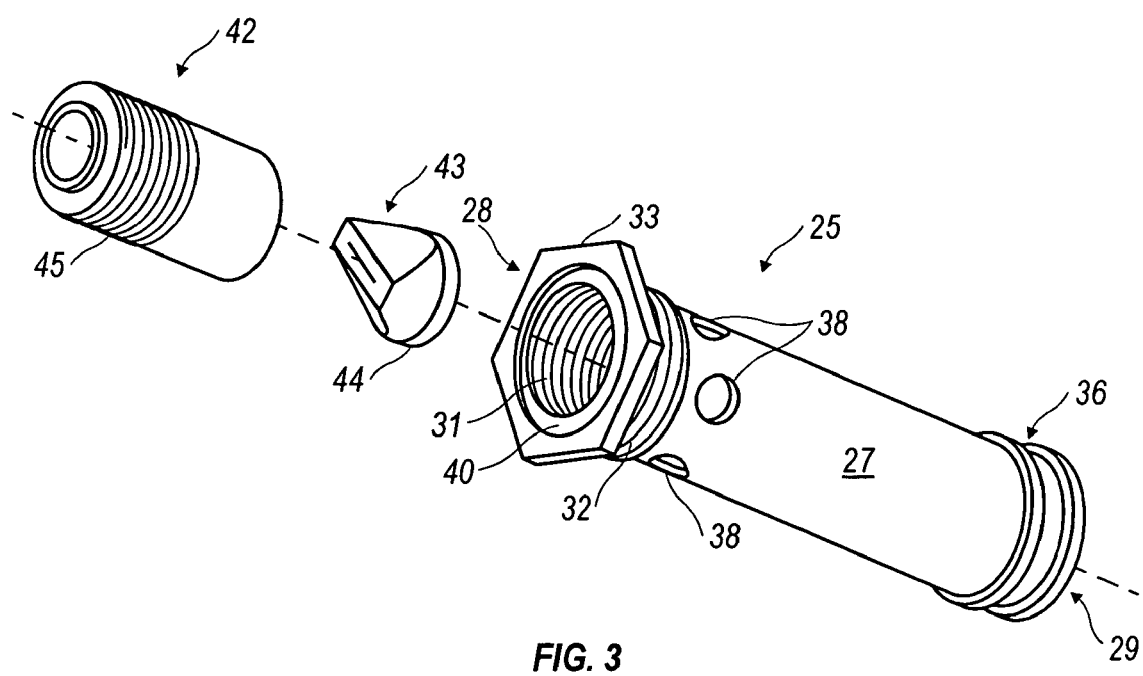
FIG. 3 is an exploded perspective view of a valve adapter according to the present invention illustrated with an optional backflow preventer.
Figure 4:
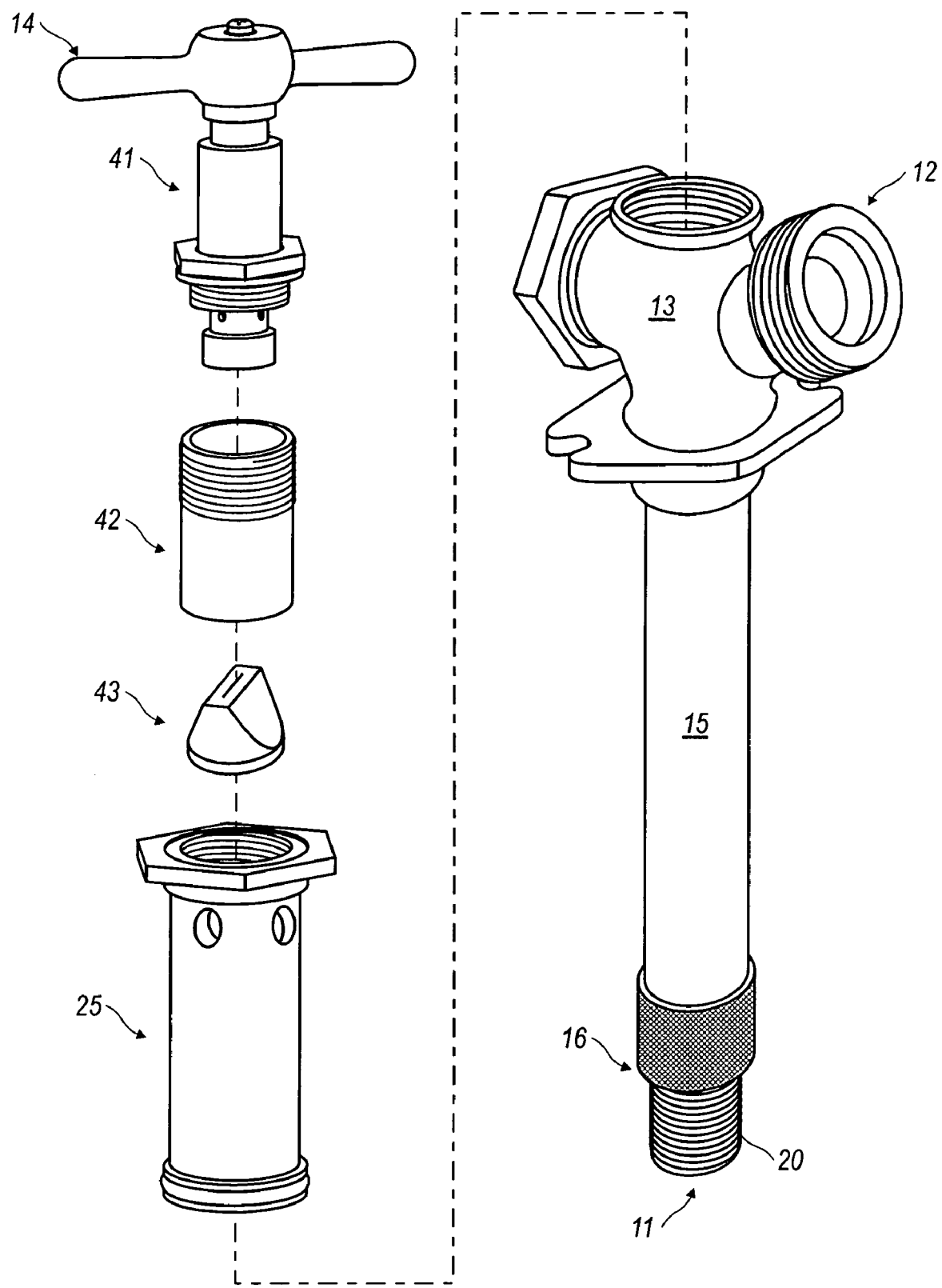
FIG. 4 is an exploded perspective view of one embodiment of a valve adapter according to the present invention illustrating placement of the adapter with a commercially available valve and a water hydrant for housing the adapter and valve.
Figure 5:
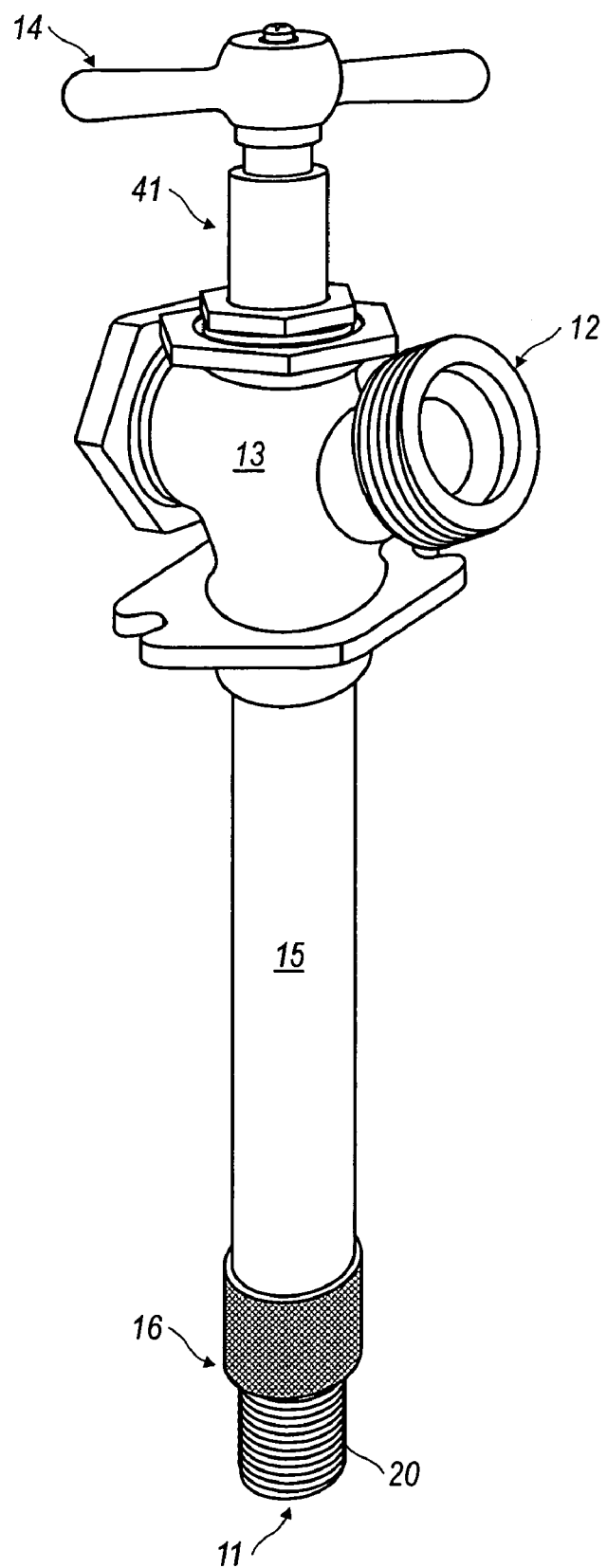
FIG. 5 is a perspective view of a water hydrant assembled with a valve adapter according to the present invention and a commercially available valve.

As illustrated in the cross-sectional view of FIG. 2, the interior of the adapter 25 stem includes an internal passageway. This passageway is comprised of an upper anterior interior wall or bore 30 and a lower posterior interior wall or bore 39. In one aspect, the upper bore 30 is of a larger diameter than the lower bore 39. By being of differing diameters, an anterior end seat 35 is formed between the upper bore 30 and the lower bore 39, the function of which will be described more fully herein below.

The upper bore 30 is capable of receiving an appropriately sized valve stem by mating an anterior internal threaded portion 31 with an externally threaded portion of the valve 41. In one aspect, either the valve 41 or the anterior end 28 of the adaptive fitting 25 is provided with a gasket for effecting a seal between the valve 41 and the coupling 25. In one embodiment, where the valve 41 is provided with the gasket, the anterior or valve engaging end 28 of the adapter 25 has a seat 40 for fittingly disposing the valve gasket therein, thereby effecting the seal between the valve 41 and the adapter 25.

Once connected to the coupling 25, the stem of the valve 41 can be longitudinally or lengthwise moved along the upper bore 30 by rotation of the valve handle 14. In the valve-closed position, the valve stem sealingly abuts the anterior gasket seat 35, thereby preventing flow through the hydrant. By opening the valve 41, the valve stem is moved away from the anterior seat 35, allowing flow from the posterior end 29 through the lower and upper bores 30, 39, out the port(s) 38 and out the discharge end 12 of the hydrant.

The anterior end 28 of the coupling 25 is further provided with an externally threaded portion 32. The diameter of this portion 32 is such that it is able to threadedly engage with the faucet head 13. The anterior end 28 can be further provided with an anterior end nut 33 for tightening the coupling 25 to and loosening it from the faucet head 13. In one embodiment, positioned between the nut 33 and the threaded portion 32 is an anterior gasket 34 for sealing the connection between the coupling 25 and the faucet head 13.

In an optional embodiment, the coupling 25 is further provided with a backflow connector 42 and backflow preventer 43. This backflow preventer 43 can be any of a variety of designs known in the art such as a ball-type backflow preventer. As illustrated, the backflow preventer 43 is a vented or slotted type that allows flow through from the posterior end 29 toward the anterior end 28, but not back. In the embodiment illustrated, the backflow preventer 43 and backflow connector 42 are slightly smaller in diameter than the anterior internal bore 30. The backflow preventer 43 has a ring portion 44 for mating with the anterior end seat 35. In one aspect, the external diameter of the ring portion 44 is of the same or similar diameter as the external diameter of the connector 42.

The connector 42 has a threaded portion 45 that is threadedly engageable with the internal anterior threaded end 31 of the coupling 25. The connector 42 and preventer 43 are of such length as to extend from the anterior seat 35 to at least a portion of the internal threaded end 31. The threaded portion 45 of the backflow connector 42 is preferably smaller than the anterior internal threaded end 31. In this manner, as the valve 41 threadedly engages with the fitting 25, the turning of the valve 41 onto the fitting 25 will turn the connector 42 and preventer 43 into the anterior bore 30 until the preventer 44 sealingly mates with the anterior seat 35. In another embodiment, the anterior passageway through the connector 42 is of such a design that a tool such as a hex wrench can secure the connector 42 and preventer 43 within the inner passageway of the adapter 25.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

INDUSTRIAL APPLICABILITY

The present invention finds applicability in the valve industry, and more specifically in adaptive fittings for valves. Of particular importance is the invention's ability to enable the replacement of current water hydrant valves. For those valves installed in walls, the present invention accomplishes this without damaging the wall that the hydrant may be installed in.

What is claimed is:

1. An adapter comprising:
    a substantially hollow member having an outer surface, a posterior interior wall having a posterior inner diameter and an anterior inner surface having an anterior inner diameter;
    an anterior inner threaded surface extending at least a portion of the anterior inner surface;
    an anterior outer threaded surface extending about at least a portion of the anterior inner surface;
    a posterior sealing portion; and
    one or more ports positioned on the hollow member for allowing flow from the inner surface to the outer surface.

2. The adapter according to claim 1 further comprising a backflow preventer for preventing flow from returning through the posterior sealing portion.

3. The adapter according to claim 2 wherein the backflow preventer further comprises a threaded portion for threadedly engaging with the anterior inner threaded surface.

4. The adapter according to claim 1 wherein the posterior sealing portion further comprises a gasket.

5. The adapter according to claim 1 wherein the anterior outer threaded surface further comprises an anterior gasket for sealingly engaging with a faucet head.

6. An adaptive fitting for connecting a valve to a water hydrant, the fitting comprising:
    a fitting body having a first end and a second end, the fitting body defining an inner passageway extending from the first end to the second end;
    a valve engaging portion disposed on the first end of the fitting body, the valve engaging portion having a threaded region for threadably engaging a threaded set of a valve;
    a sealing portion disposed on the second end of the fitting body; and
    one or more ports disposed about or near the first end of the fitting body for allowing flow there through.

7. The fitting according to claim 6 further comprising a backflow preventer for preventing flow from returning through the sealing portion.

8. The fitting according to claim 7 wherein the backflow preventer further comprises a threaded portion for threadedly engaging with the valve engaging portion.

9. The fitting according to claim 6 wherein the sealing portion further comprises a gasket.

10. The fitting according to claim 6 wherein the first end further comprises a hydrant engaging portion for securing the fitting to a hydrant.

11. The fitting according to claim 10 wherein the hydrant engaging portion further comprises a gasket for sealingly engaging with a faucet head.

* * * * *